(12) United States Patent  
Gogo et al.

(10) Patent No.: US 6,325,402 B1
(45) Date of Patent: Dec. 4, 2001

(54) HANDLEBARS SUPPORT STRUCTURE FOR A MOTORCYCLE

(75) Inventors: Kazuhiko Gogo; Kuniaki Wakamatsu, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/389,078

(22) Filed: Sep. 2, 1999

(30) Foreign Application Priority Data

Feb. 9, 1998 (JP) .................................................. 10-248840

(51) Int. Cl.[7] .......................... B62M 15/00; B62M 7/00; B62K 21/12
(52) U.S. Cl. .......................... 280/279; 280/276; 180/219; 74/554.1
(58) Field of Search .................................... 280/276, 277, 280/279, 283; 180/219; 74/551.1

(56) References Cited

U.S. PATENT DOCUMENTS

| 1,502,151 | * | 7/1924 | Meredith | 280/276 |
| 3,243,006 | * | 3/1966 | Sparks | 280/276 |
| 5,511,444 | * | 4/1996 | Clausen et al. | 280/276 |
| 5,752,711 | * | 5/1998 | Moreau | 280/276 |
| 6,026,939 | * | 2/2000 | Girvin et al. | 280/276 |

FOREIGN PATENT DOCUMENTS 2169382   6/1990   (JP) .

* cited by examiner

*Primary Examiner*—Brian L. Johnson
*Assistant Examiner*—Matthew Luby

(57) ABSTRACT

A handlebars support structure for a motorcycle includes a top bridge mounted on an upper portion of a front fork. A rotary shaft is mounted on the top bridge and extends horizontally in a direction of the width of the motorcycle. A handlebars holder for supporting handlebars is mounted on the rotary shaft, such that the handlebars holder can pivot relative to the top bridge about the shaft. A damping unit, including a spring and shock absorber, is interposed between the handlebars holder and the top bridge. The damping unit can absorb small vibrations and large impacts, thereby preventing transmission of the vibrations and the impacts from the front fork to the handlebars.

20 Claims, 8 Drawing Sheets

HANDLEBARS SUPPORT STRUCTURE FOR A MOTORCYCLE

BACKGROUND OF THE INVENTION

1. Field of the Invention

The present invention relates to a handlebars support structure for a motorcycle.

2. Description of the Relevant Art

A handlebars support structure for a motorcycle is disclosed in Japanese Unexamined Patent No. 2-169382. The Japanese Unexamined Patent relates to a handlebars support device which can absorb vibration sufficiently and produce good appearance. As shown in FIG. 9 and FIG. 10, the handlebars support device includes a front fork 116 and an upper bracket 113 fixed to the upper portion of the front fork 116. A handlebars holder 112 mounted in a floating manner on the upper bracket 113 with a bolt 115 passed through an elastic bush 114, and a pair of handlebars 110, 111 mounted on the handlebars holder 112.

In the technology described above, it is possible to absorb the small vibrations of the upper bracket 113 via the elastic bush 114 and to prevent the vibrations from propagating to the handlebars holder 112 and the handlebars 110, 111. However, it is difficult to absorb a large impact transmitted to the upper bracket 113 from the road via the wheel and the front fork 116 using only the deformation of the elastic bush 114.

SUMMARY OF THE INVENTION

Taking the foregoing problems of the related art into consideration, it is an object of the present invention to provide a handlebars support structure for a motorcycle which can absorb small vibrations and large impacts, and thereby reduce vibrations from being transmitted to the handlebars.

Further, it is an object of the present invention to provide a handlebars support structure which improves the riding comfort of the motorcycle, improves the operational ease of the handlebars, and reduces fatigue caused by long hours of driving.

Moreover, it is an object of the present invention to provide a handlebars support structure which allows its components, such as a separated damper and spring, to be easily checked and replaced, thus improving maintainability as compared with a structure wherein the spring and the damper are integrally arranged.

These and other objects of the invention are fulfilled by a handlebars support structure for a motorcycle, said handlebars support structure comprising: a first member for attachment to the motorcycle; a second member pivotally mounted to said first member for holding handlebars; and a dampening unit connecting said first member and said second member.

Further, these and other objects of the invention are fulfilled by a handlebars support structure for a motorcycle, said handlebars support structure comprising: a top bridge for mounting on an upper portion of a front fork of the motorcycle; a rotary shaft mounted on said top bridge and extending horizontally and in a direction of a width of the motorcycle; a handlebars holder, for supporting handlebars, mounted on said rotary shaft such that said handlebars holder can move approximately up and down in direction; and a damping unit interposed between said handlebars holder and said top bridge.

Moreover, these and other objects of the invention are fulfilled by a motorcycle comprising: a front fork; a bridge attached to an upper portion of said front fork; a support structure attached to said bridge at a first pivotal engagement; handlebars attached to said support structure; and a damper having a first end attached to said bridge at a second pivotal engagement, and a second end attached to said support structure at a third pivotal engagement.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
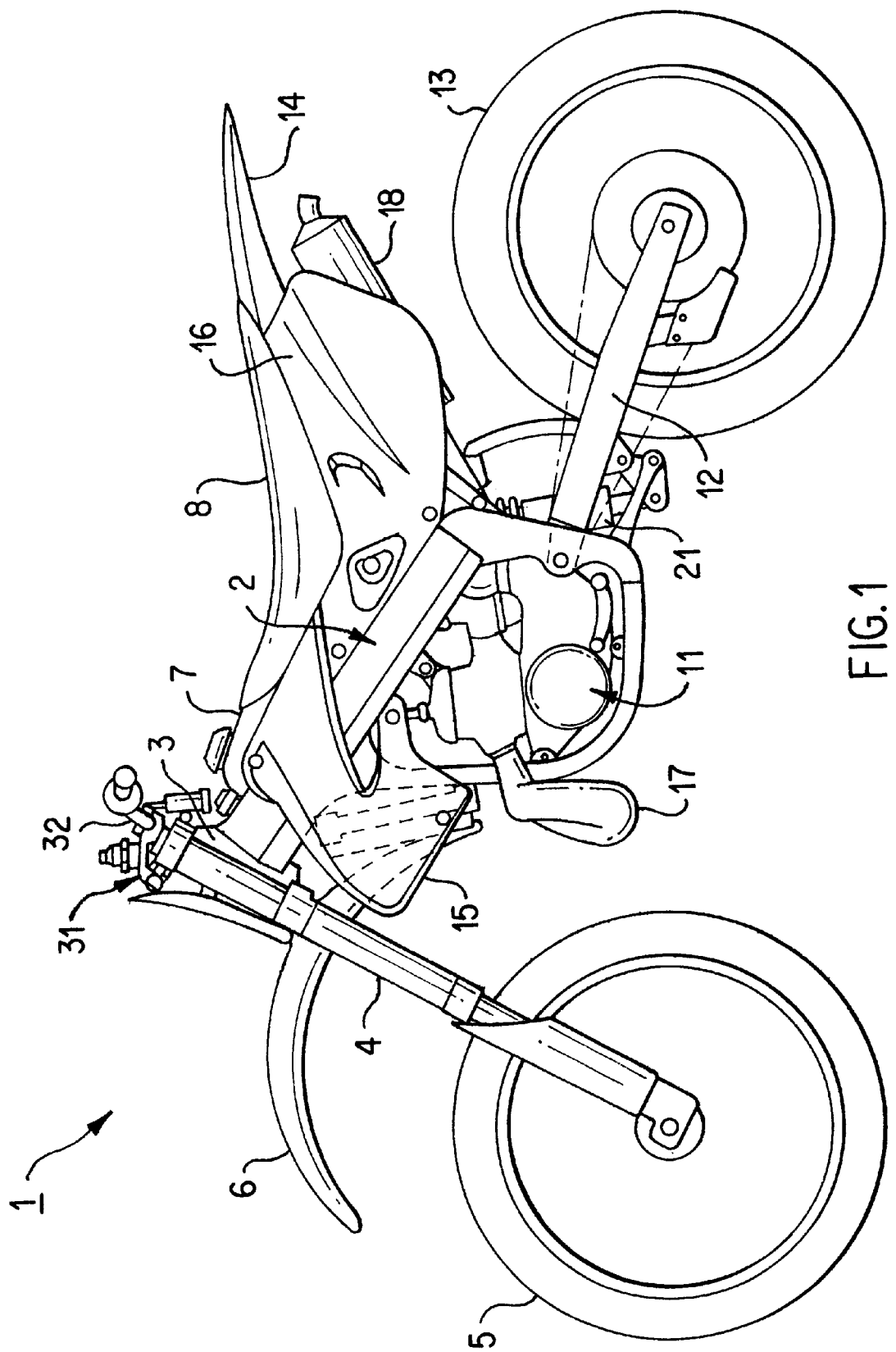
FIG. 1 is a side view of a motorcycle employing the handlebars mounting structure, in accordance with the present invention.

FIG. 1 is a side view of a motorcycle employing the handlebars mounting structure for a motorcycle in accordance with present invention. The motorcycle 1 includes a head pipe 3 mounted on the front portion of a vehicle frame 2. A front fork 4 is rotatably mounted on the head pipe 3. A front wheel 5 is rotatably mounted on the lower portion of the front fork 4, and a front fender 6 covers the upper portion of the front wheel 5.

The motorcycle 1 further comprises a fuel tank 7 fixed to the upper portion of the vehicle frame 2. A seat 8 is arranged in the rear of the fuel tank 7. A power unit 11, including an engine and a transmission, is arranged under the fuel tank 7 and the seat 8. A swing arm 12 is mounted on the vehicle frame 2 in the rear of the power unit 11 such that it can swing. A rear wheel 13 is rotatably mounted on the rear end of the swing arm 12 and driven by the power unit 11, and a rear fender 14 covers the upper portion of the rear wheel 13.

The motorcycle 1 also includes a front cowling 15, a rear cowling 16, an exhaust pipe 17, a muffler 18, and a rear suspension 21. Further, the motorcycle 1 is provided with a handlebars holder 31 mounted on the upper portion of the front fork 4 such that it can swing. Handlebars 32 are mounted on the handlebars holder 31.

Figure 2:
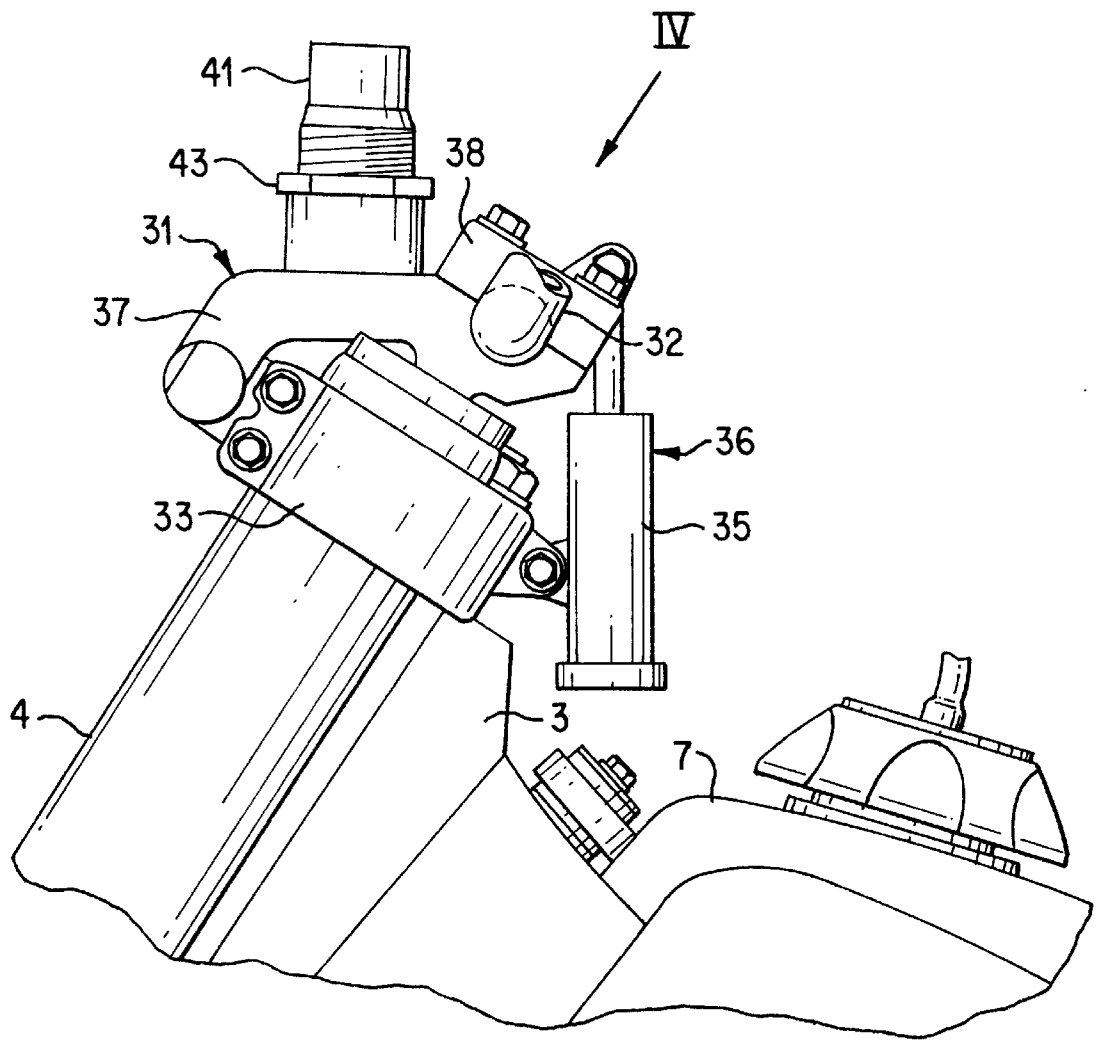
FIG. 2 is a side view showing the handlebars structure.

FIG. 2 is a side view showing the handlebars structure of a motorcycle, in accordance with present invention. As shown in FIG. 2, the handlebars holder 31 is mounted on a front portion, or first member, of a top bridge 33 constituting the upper portion of the front fork 4. The handlebars holder 31, or second member, can swing, that is, move in the nearly up and down direction in a nearly horizontal range. The handlebars 32 are mounted on the handlebars holder 31. A damping unit 36 including a coil spring 34, described below, and a damper 35 is disposed between the handlebars holder 31 and the top bridge 33.

Figure 3:
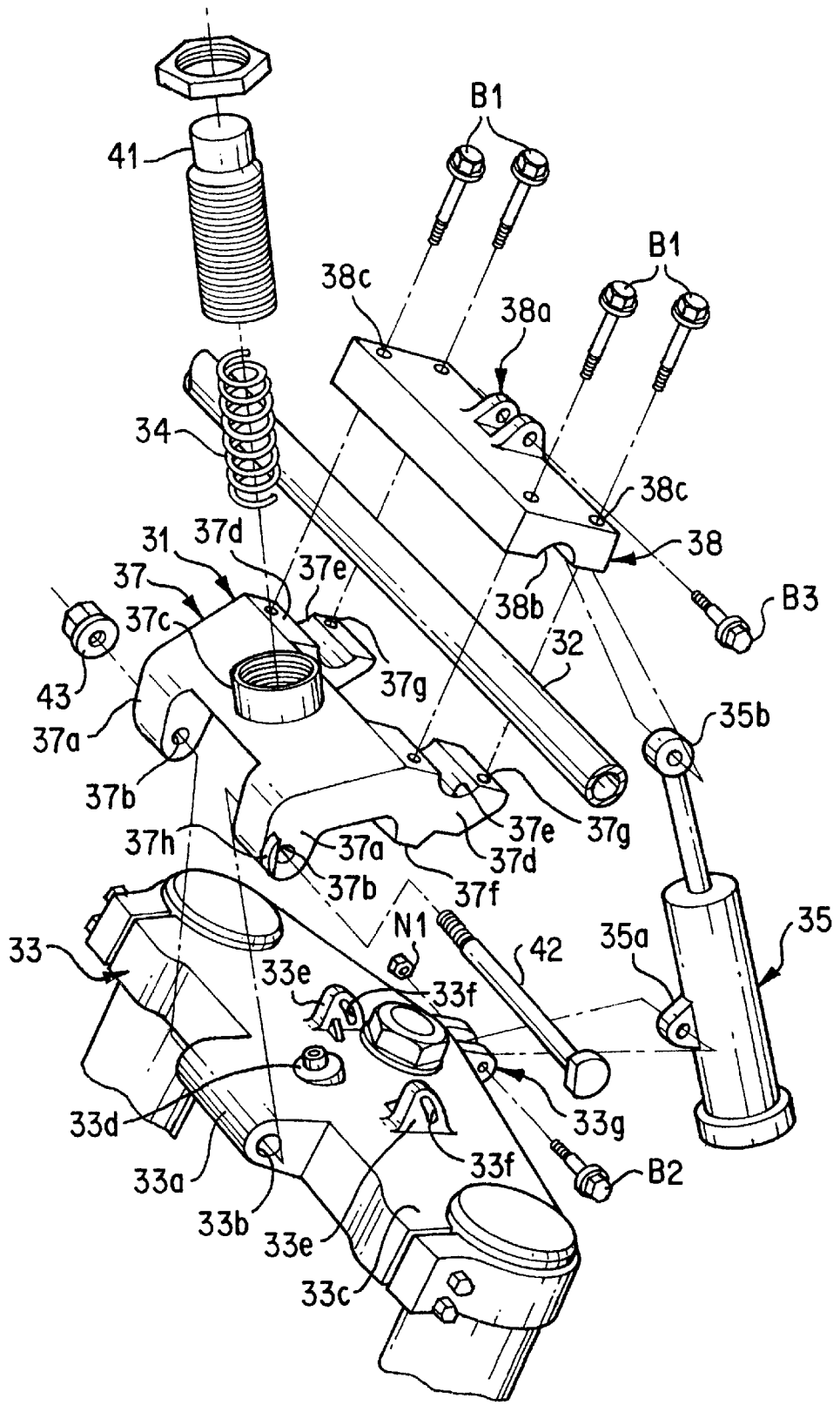
FIG. 3 is an exploded view, in perspective, showing the handlebars mounting structure.

FIG. 3 is an exploded view, in perspective, showing the handlebars mounting structure of a motorcycle in accordance with present invention. The handlebars holder 31 sandwiches the handlebars 32 by a lower holder 37 and an upper holder 38. A plurality of bolts B1 fasten the lower holder 37 to the upper holder 38.

The top bridge 33 includes a projecting portion 33a mounted on the front portion. A first through hole 33b is formed in the projecting portion 33a. A seat portion 33d is formed on the top surface 33c for receiving the bottom end of the coil spring 34. Upper stoppers 33e, 33e are formed on the top surface 33c for regulating the up movement of the up and down movement of the handlebars holder 31. Arced grooves, or guide slots, 33f, 33f are formed in the stoppers 33e, 33e. A lower damper support portion 33g is formed on the rear portion for mounting the lower mounting portion 35a of the damper 35.

The lower holder 37 includes a pair of front arm portions 37a, 37a mounted on the front portion. Second through holes 37b, 37b are formed in the front arm portions 37a, 37a. A cylindrical portion 37c is formed on the lower holder 37. The cylindrical portion 37c is threaded and receives a threaded cylindrical member 41. The coil spring 34 is received by the cylindrical member 41. Rear arm portions 37d, 37d are formed on a rear portion. Lower circular grooves 37e, 37e are formed on the top portion of the rear arm portions 37d, 37d for sandwiching the handlebars 32 therewith. Lower stoppers 37f, 37f (the deep stopper is not shown) are formed on the bottom portions of the rear arm portions 37d, 37d for regulating the down swing movement of the handlebars holder 31 by abutting on the top surface 33c of the top bridge 33. Female threaded portions 37g are provided on arm portions 37d, 37d into which bolts B1 are screwed. A bolt B2 and a nut N1 are provided for mounting the bottom portion of the damper 35 to the lower damper support portion 33g.

The lower holder 37 is mounted on the top bridge 33 such that it can move in the nearly up and down direction by passing a long bolt 42, functioning as a rotary shaft, through the first through hole 33b and the econd through holes 37b, 37b of the top bridge 33. A nut 43 is screwed onto the long bolt 42. A projecting portion 37h is formed on the side of one front arm portions 37a for preventing the long bolt 42 from rotating.

The upper holder 38 includes an upper damper support portion 38a for mounting the upper mounting portion 35b of the damper 35 on the top surface thereof. An upper circular groove 38b sandwiches the handlebars 32 in conjunction with the lower circular grooves 37e, 37e. Bolt holes 38c are provided in upper holder 38 to receive the bolts B1. A bolt B3 connects the top portion of the damper 35 to the upper damper support portion 38a. It is important to note that the long bolt 42 extends horizontally in the direction of the width of the vehicle.

Figure 4:
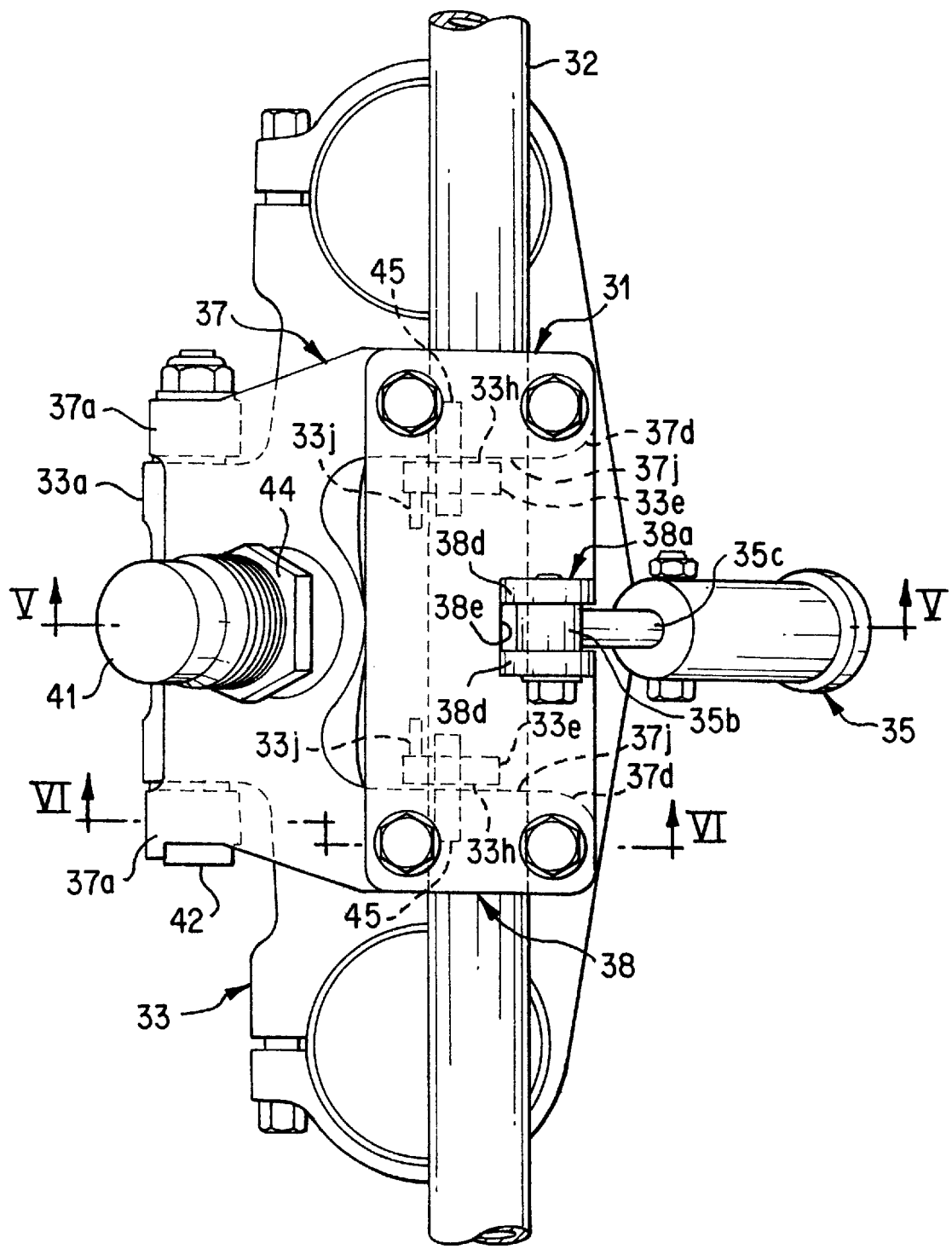
FIG. 4 is a view from the perspective of an arrow IV in FIG. 2.

FIG. 4 is a view taken from the vantage of arrow IV in FIG. 2. The cylindrical member 41 is fixed to the handlebars holder 31 with a lock nut 44. The inside surfaces 37j, 37j of the rear arm portions 37d, 37d of the lower holder 37 are brought near to the outside surfaces 33h, 33h of the upper stoppers 33e, 33e.

Since the inside surfaces 37j, 37j are brought near to the outside surfaces 33h, 33h of the upper stoppers 33e, 33e, in the case where an external force is applied to the handlebars 32 from one longitudinal direction, for example, because of a roll over accident, the outside surface 33h of the upper stopper 33e receives the inside surface 37j of the rear arm portion 37d to prevent the handlebars holder 31 from moving in the lateral direction of the vehicle body. This can prevent an external force applied to the projecting portion 33a of the top bridge 33, the front arm portion 37a of the lower holder 37, and the long bolt 42, thereby preventing these portions from being broken.

Since the upper stoppers 33e, 33e are made sufficiently apart from the long bolt 42, when they receive the inside surfaces 37j, 37j of the lower holder 37 as described above, a large load is not applied to the upper stoppers 33e, 33e, which eliminates the possibility that the upper stoppers 33e, 33e could be broken. Further, the upper stoppers 33e, 33e are provided with the reinforcing inside ribs 33j, 33j.

The upper damper support portion 38a of the upper holder 38 includes mountain shaped portions 38d, 38d. A cutout portion 38e is formed between the mountain shaped portions 38d, 38d. The upper mounting portion 35b of the damper 35 is inserted between the mountain shaped portions 38d, 38d. This arrangement prevents the piston rod 35c of the damper 35 from interfering with the handlebars holder 31, even if the handlebars holder 31 is moved up and down.

Figure 5:
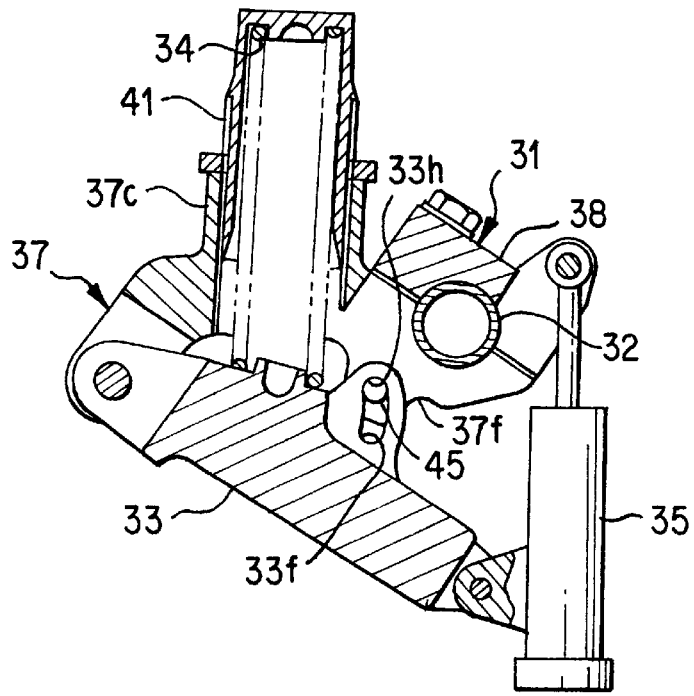
FIG. 5 is a cross sectional view taken on a line V—V in FIG. 4.

FIG. 5 is a cross sectional view taken on a line V—V in FIG. 4. The coil spring 34 is disposed between the cylindrical member 41 mounted on the lower holder 37 and the top bridge 33 to bias the is handlebars holder 31 upward. The handlebars holder 31 is prevented from moving upward by guide pins 45. Each pin 45 is horizontally inserted into each lower stopper 37f of the lower holder 37 and each arced groove 33f of the top bridge 33. Each pin 45 is put into contact with the end portion 33h of each arced groove 33f of the top bridge 33.

The setting load of the coil spring 34, that is, the load generated by the coil spring 34 when the handlebars holder 31 is moved uppermost can be changed by rotating the cylindrical member 41 with respect to the cylindrical portion 37c. Rotating the cylindrical member 41 moves it up and down. Therefore, for example, by changing the setting load in accordance with the preferences of a driver, the mobility of the handlebars older 31 can be controlled.

The damper 35 is interposed between the upper holder 38 and the top bridge 33. The damper 35 damps the vibrations or the impacts transmitted to the handlebars 32 from the top bridge 33. A gas damper, an oil damper, or a gas filled, oil damper is suitable as the damper 35.

Figure 6:
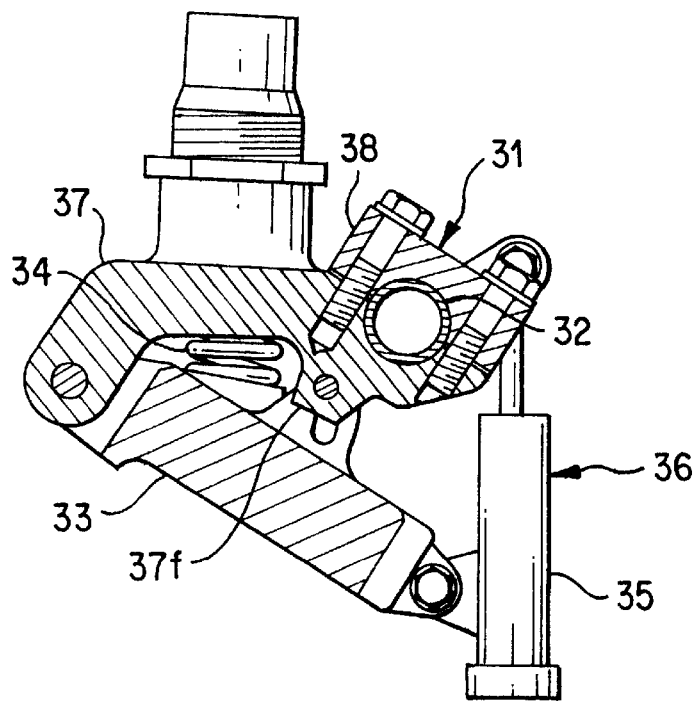
FIG. 6 is a cross sectional view taken on a line VI—VI in FIG. 4.

FIG. 6 is a cross sectional view taken on a line VI—VI in FIG. 4. The lower holder 37 of the handlebars holder 31 is provided with the lower stopper 37f at the bottom portion thereof. In the preferred embodiment, the coil spring 34 and the damper 35 are arranged separately in the open space above the front fork 4, and in the rear of the handlebars 32, respectively. See FIG. 1. This allows the overall damping unit 36 to be arranged near the handlebars 32 in a compact construction.

Figure 7C:
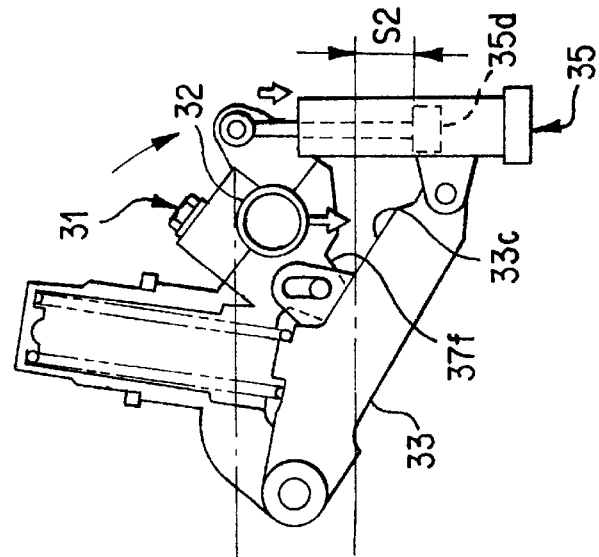
FIG. 7 is an illustration of a first action of the handlebars mounting structure.
Figure 7B:
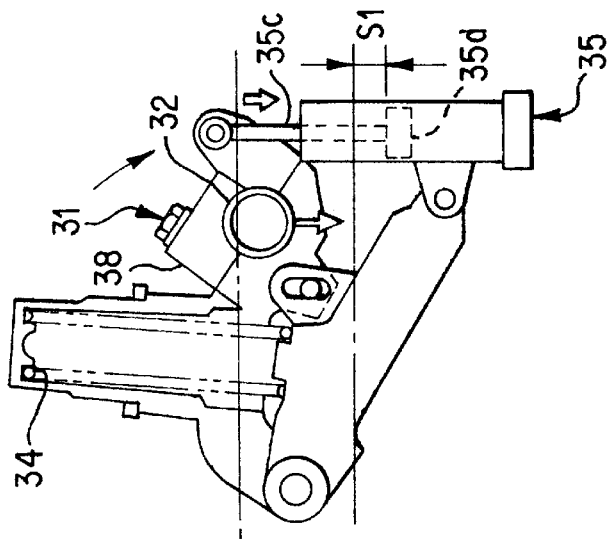
Figure 7A:
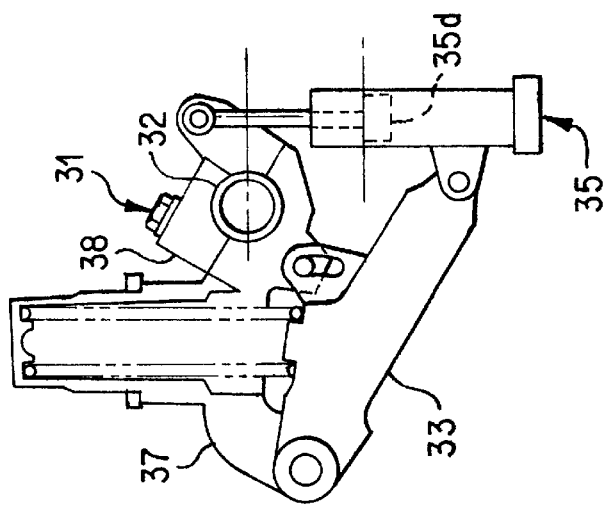

The action of the handlebars mounting structure of the motorcycle described above will hereinafter be described. FIGS. 7(a) to (c) are illustrations of a first action of the handlebars mounting structure of the motorcycle in accordance with present invention. FIG. 7(a) shows a state where an external force is not applied to the handlebars 32 and the handlebars 32 are positioned uppermost. In this respect, in order to help the understanding of the action of the damper 35, a piston 35d is shown in the damper 35.

In FIG. 7(b), shows a state where a jumping motorcycle lands on the ground. A down force is applied to the handlebars 32 to swing the handlebars holder 31 downwardly. This contracts the coil spring 34 and moves down the piston 35d by a distance sl, via the piston rod 35c connected to the upper holder 38. This generates a damping force in the damper 35 to absorb the impact produced when the motorcycle lands on the ground, whereby the impact is less propagated to the handlebars 32.

In FIG. 7(c), the handlebars holder 31 swings further downwardly to move down the handlebars 32, thereby moving down the piston 35d by a distance s2 to damp the impact further. At this time, the lower stopper 37f of the handlebars holder 31 is put into contact with the top surface 33c of the top bridge 33 to stop the down movement of the handlebars holder 31.

Figure 8:
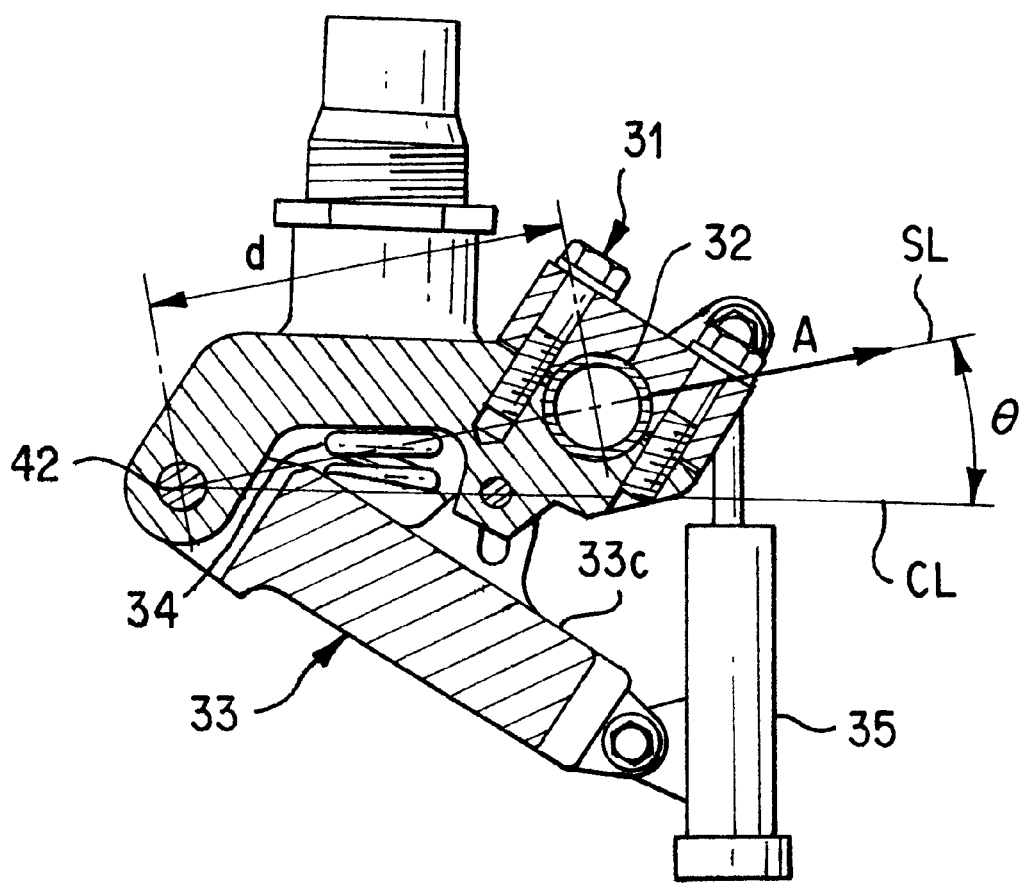
FIG. 8 is an illustration of a second action of the handlebars mounting structure.
Figure 9:
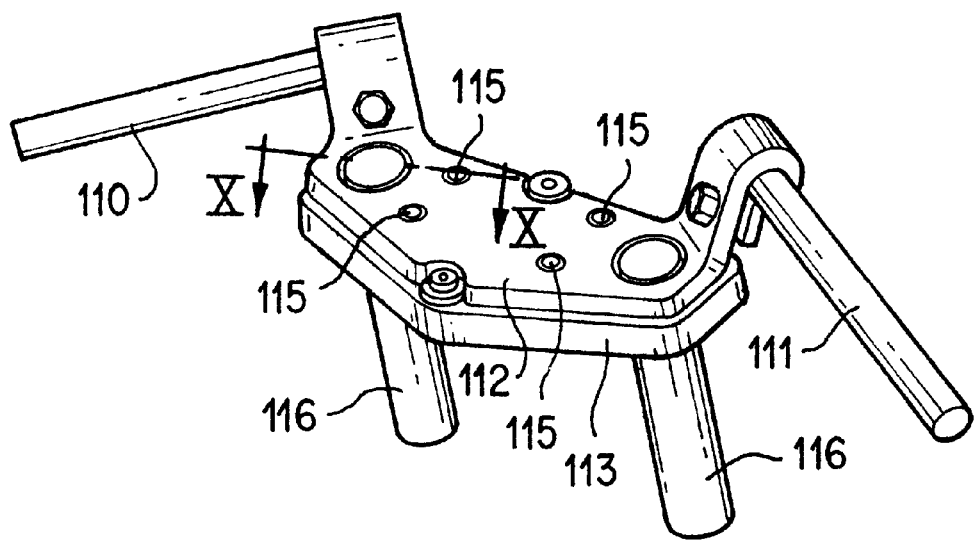
FIG. 9 is an illustration of a handlebars mounting structure in accordance with the background art.
Figure 10:
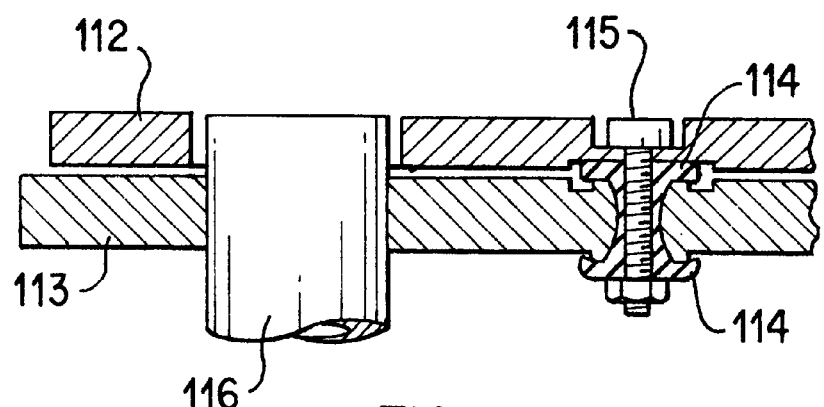
FIG. 10 is a cross sectional view taken on a line X—X in FIG. 9.

FIG. 8 is an illustration of a second action of the handlebars mounting structure of the motorcycle in accordance with present invention. When the motorcycle lifts the front wheel to get over a fallen stone on the road while running, the driver sometimes pulls the handlebars 32 to the rear side and in a slanting upward direction as shown by an arrow in the drawing. The pulling causes the center of gravity of the motorcycle to shift to the rear wheel side.

Since the long bolt 42 of the rotary shaft of the handlebars holder 31 is disposed in front of the handlebars 32 and under the handlebars 32, the direction in which the driver pulls the handlebars 32 (direction of an arrow A) can be made to nearly agree with the direction of a straight line SL. The straight line SL joins the handlebars 32 to the long bolt 42 (a straight line determining an angle o with a horizontal line CL). Because of the alignments, rotational movement around the long bolt 42 is reduced and rotation or movement of the handlebars holder 31, and the handlebars 32, is prevented. Therefore, the operability of the handlebars 32 is consistent with fixed handlebars when the driver pulls on the handlebars 32 to shift the center of gravity of the motorcycle.

A distance d from the long bolt 42 to the handlebars 32 can be increased to increase the up and down movement of the handlebars 32. Increasing the distance d increases the contraction of the coil spring 34 and the stroke of the damper 35 to easily absorb the vibrations or the impacts. Also, the rotational angle of the handlebars 32 can be reduced and does not have an effect on the operation of a throttle, or the like.

Although the spring illustrated in the present invention is the coil spring 34 (compression spring), other types of springs may be substituted. A tension coil spring, a plate spring, a coned disc spring, or a torsion bar may be used as the spring.

The invention being thus described, it will be obvious that the same may be varied in many ways. Such variations are,not to be regarded as a departure from the spirit and scope of the invention, and all such modifications as would be obvious to one skilled in the art are intended to be included within the scope of the following claims.

What is claimed:

1. A handlebars support structure for a motorcycle, said handlebars support structure comprising:
    a first member for attachment to the motorcycle;
    a second member including structure for holding handlebars, said second member being pivotally attached to said first member so as to move relative to said first member about a general axis of rotation, with said structure for holding handlebars located rearward of said general axis of rotation, in a direction of travel of the motorcycle; and
    a dampening unit connecting said first member and said second member.

2. The handlebars support structure according to claim 1, wherein said first member is a top bridge for connection to a front fork of the motorcycle.

3. The handlebars support structure according to claim 1, wherein said dampening unit includes a shock absorber and a spring.

4. The handlebars support structure according to claim 3, wherein said shock absorber includes a first pivotal connection to said first member and a second pivotal connection to said second member.

5. The handlebars support structure according to claim 4, wherein said shock absorber is located rearward of the handlebars, in a direction of travel of the motorcycle.

6. The handlebars support structure according to claim 3, wherein said spring is a coil spring having a first end abutting said first member and a second end inside a cylindrical member attached to said second member to apply a biasing force between said first member and said second member.

7. The handlebars support structure according to claim 6, wherein said cylindrical member is threaded into said second member such that rotation of said cylindrical member relative to said second member causes the biasing force to change.

8. The handlebars support structure according to claim 6, wherein said cylindrical member extends above the handlebars.

9. The handlebars support structure according to claim 1, wherein said second member is pivotally attached to said first member via a bolt.

10. The handlebars support structure according to claim 1, wherein said first member includes a guide slot and said second member includes a guide pin engaged within said guide slot to limit the degree of pivoting between said second member and said first member.

11. A handlebars support structure for a motorcycle, said handlebars support structure comprising:
    a top bridge for mounting on an upper portion of a front fork of the motorcycle;
    a rotary shaft mounted on said top bridge and extending horizontally and in a direction of a width of the motorcycle;
    a handlebars holder, for supporting handlebars, mounted on said rotary shaft such that said handlebars holder can move approximately up and down in direction; and
    a damping unit interposed between said handlebars holder and said top bridge, wherein said rotary shaft is disposed in front of the handlebars, in a direction of travel of the motorcycle.

12. The handlebars support structure according to claim 11, wherein said rotary shaft is disposed under the handlebars.

13. The handlebars support structure according to claim 11, wherein said top bridge is provided with stoppers for regulating lateral movement of the handlebars holder, said stoppers being located remotely from said rotary shaft.

14. The handlebars support structure according to claim 11, wherein said damping unit includes a spring and a damper, said spring being remotely located relative to said damper.

15. The handlebars support structure according to claim 14, wherein said damper is located rearward of the handlebars.

16. A motorcycle comprising:

a front fork;

a bridge attached to an upper portion of said front fork;

a support structure attached to said bridge at a first pivotal engagement;

handlebars attached to said support structure, with said handlebars being located rearward of said first pivotal engagement, in a direction of travel of said motorcycle; and a damper having a first end attached to said bridge at a second pivotal engagement, and a second end attached to said support structure at a third pivotal engagement.

17. The motorcycle according to claim 16, further comprising:

a guide slot associated with said bridge; and a guide pin associated with said support structure and existing within said guide slot, said guide pin limiting a degree of pivoting of said support structure relative to said bridge.

18. The motorcycle according to claim 16, further comprising:

first stops attached to said bridge; and second stops attached to said support structure, said first and second stops limiting movement of said support structure relative to said bridge in a widthwise direction of said motorcycle, perpendicular to a travel direction of said motorcycle.

19. The motorcycle according to claim 16, further comprising:

a spring abutting said bridge and said support structure to apply a biasing force therebetween.

20. The motorcycle according to claim 19, wherein said damper is located rearward of said handlebars, in a direction of travel of said motorcycle, and said spring is located forward of said handlebars, in the direction of travel of said motorcycle.

* * * * *